Aug. 3, 1943.  G. S. ALLIN  2,325,729
HYDRAULIC POWER SYSTEM FOR TRACTORS
Filed June 20, 1941  2 Sheets-Sheet 1
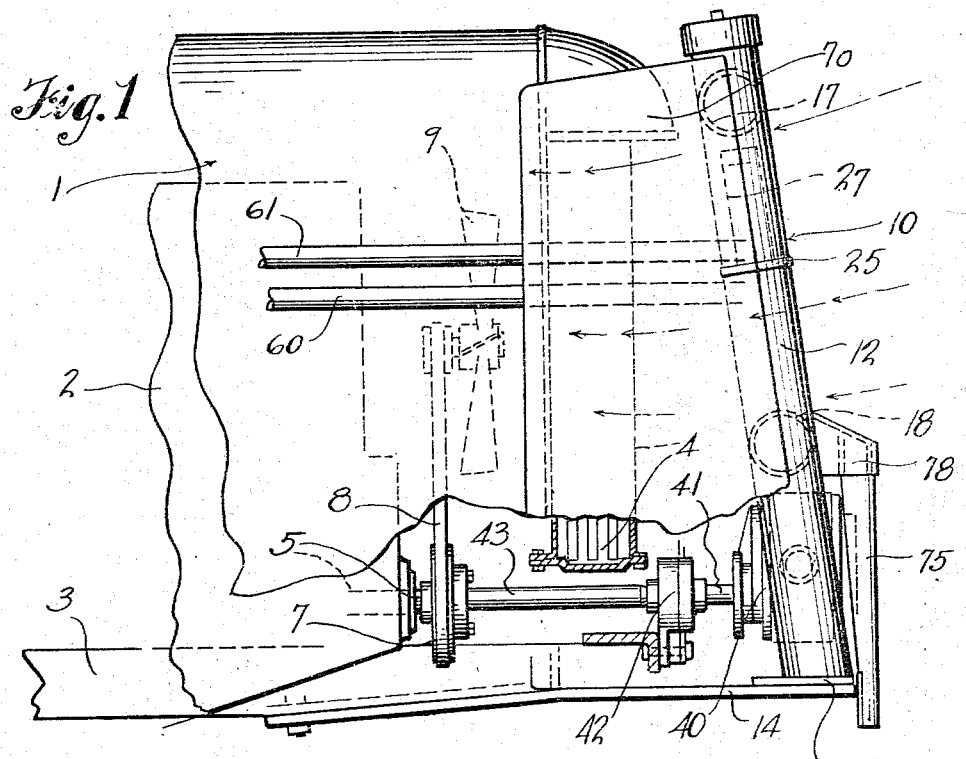
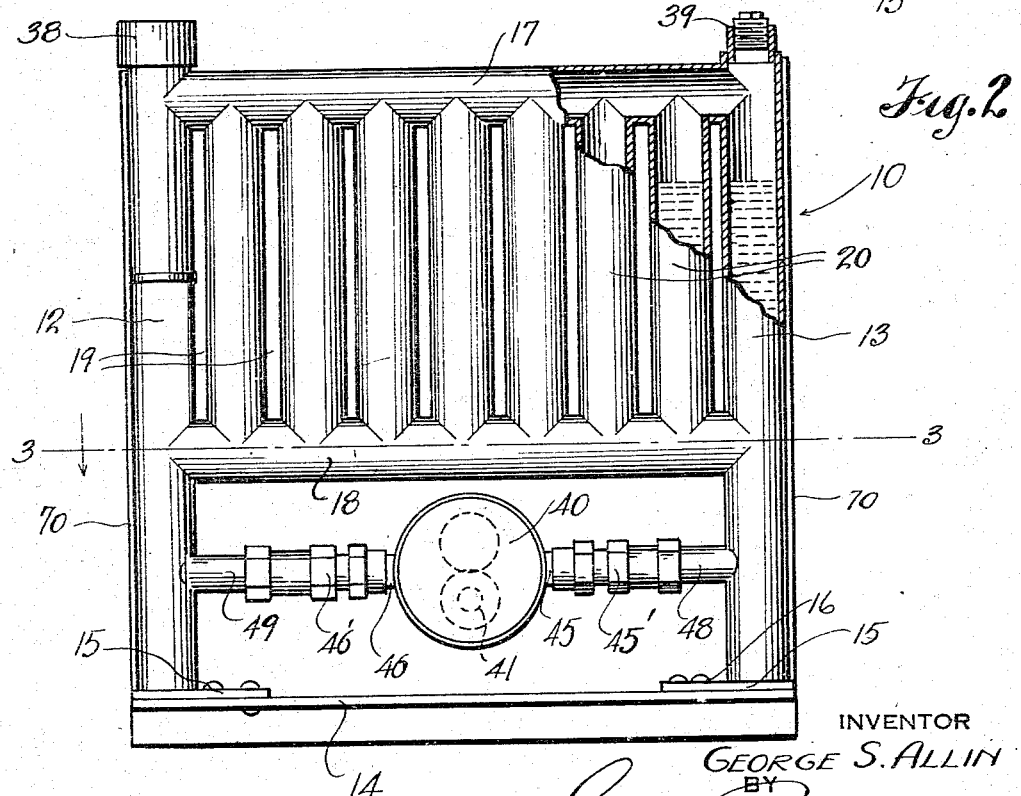
INVENTOR
GEORGE S. ALLIN
BY
Cook & Robinson
ATTORNEY

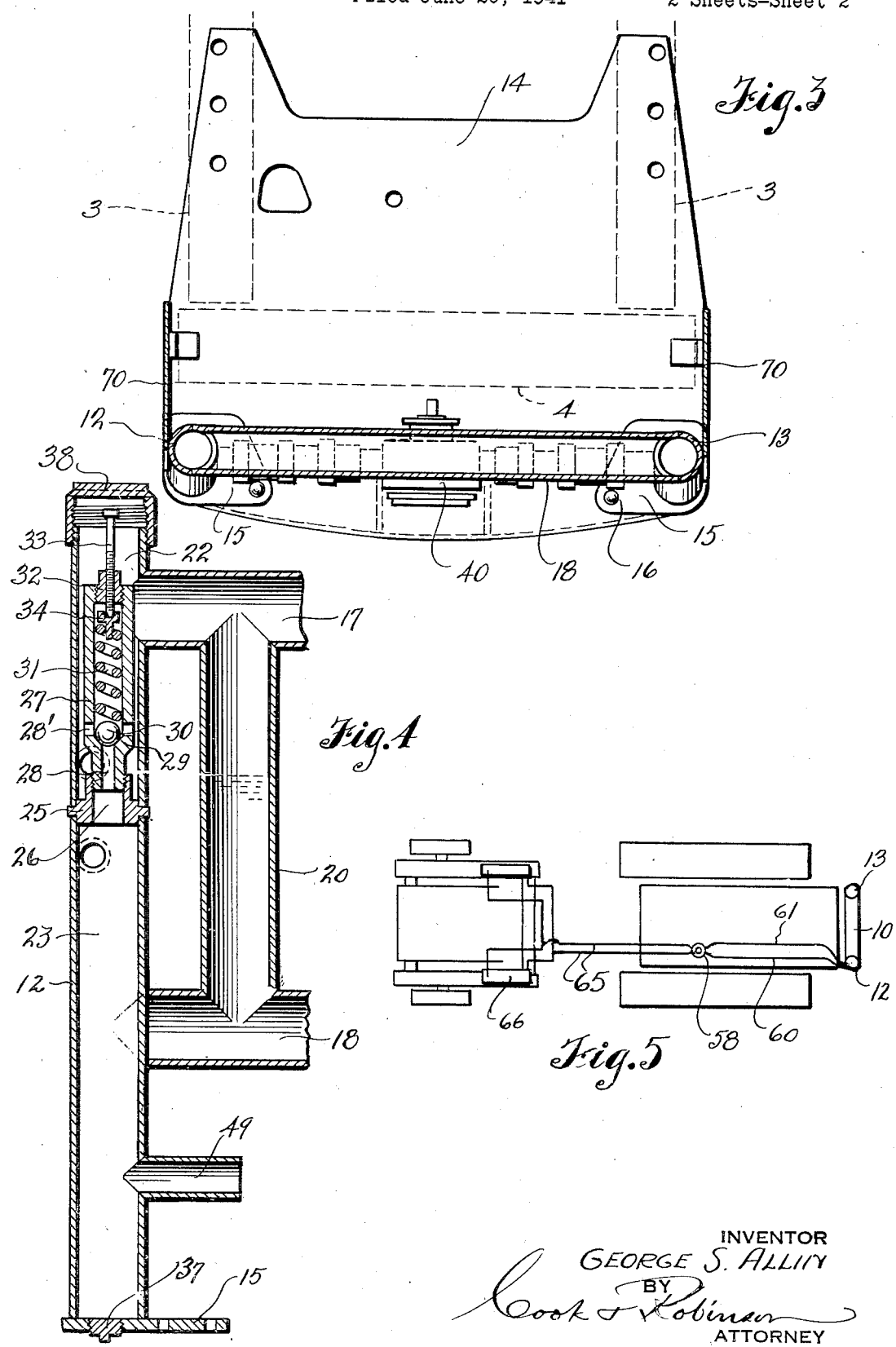

Patented Aug. 3, 1943

2,325,729

UNITED STATES PATENT OFFICE 2,325,729

HYDRAULIC POWER SYSTEM FOR TRACTORS

George S. Allin, Seattle, Wash., assignor to Isaacson Iron Works, Seattle, Wash., a corporation of Washington Application June 20, 1941, Serial No. 398,871

7 Claims. (Cl. 180—53)

This invention relates to improvements in tractors and has reference more particularly to improvements in the hydraulic power systems used in connection with tractors for the control of equipment on the tractor or on vehicles drawn and operated thereby.

Explanatory to the present invention it will here be stated that, in the equipping of tractors of the usual types, such, for example, a tractor of the crawler type, as used for the mounting and manipulation of a bulldozer, or for the drawing of any one of a number of machines, such as a scraper or a grader, a pressure pump is included and arranged on the tractor to be driven by the tractor engine for maintaining a pre-determined pressure on a stored supply of fluid pressure medium, such as oil, which is applied under manual valve control to the hydraulic jacks, or other power transmitting devices used, to effect the functional manipulation or control of the associated equipment. The pump, for practical reasons, is most generally located at the front end of the tractor where it can be directly connected with the engine drive shaft while the supply tank for the fluid pressure medium is most generally located at the rear end of the tractor. Pipe connections lead between the tank and the pump and also to the control valve located adjacent the vehicle operator's position and from the valve conduits extend to the controlled equipment.

It will be understood that, due to this usual relationship, or location of pump and tank at opposite ends of the tractor, it frequently happens in normal working conditions that the pump is disposed at a higher level than the tank, and as a consequence there may be and frequently is an interrupted delivery of oil to the pump, with the result of an impaired operation.

It is generally the case that the hydraulic pressure medium used in such systems is oil, and so there is another difficulty to be considered which results from overheating of the oil in the hydraulic system. Such overheating is not unusual and it is undesirable since it facilitates leakage of the oil under pressure past the jack pistons and through packing because of its reduced viscosity.

Still another undesirable result attributed to the usual arrangement of pump and tank at opposite ends of the tractor resides in the requirement of an extensive and what is now considered an unnecessary amount of pipe connections.

In view of the above mentioned and other disadvantages, or what may be called objectionable features of the hydraulic systems of tractors as now most generally arranged, it has been the principal object of the present invention to provide novel means, as an improvement in tractor equipment, for overcoming them; the improvements residing, for the most part, in a fluid medium or oil supply tank of tubular construction, adapted for mounting at the front end of the tractor, directly above the pump, where it will serve, not only in the capacity of a storage and pressure tank for the hydraulic medium, but also as a protective shield or guard for the front end portion of the tractor and the water cooling radiator for the fluid medium.

Furthermore, it is an object of the present invention to provide a storage tank of novel form that, in its functional association with the water cooling radiator of the tractor, takes advantage of the fan induced flow of air to the latter to facilitate the cooling of the oil, or other fluid pressure medium contained in the tank.

It is still another object of this invention to provide a storage tank adapted to serve the various purposes above mentioned; that can be so closely associated with the pump that a substantial amount of the usual pipe connections can be eliminated, and a non-interrupted supply of oil to the pump insured regardless of the inclination or disposition of the tractor in its normal working operations.

Still further objects of the invention reside in the details of construction of parts of the system and in their combination, relationship and mode of operation, as will hereinafter be fully described.

In accomplishing these and other objects of the invention, I have provided the improved details of construction, the preferred forms of which are illustrated in the accompanying drawings, wherein—

Fig. 1 is a side elevation, with parts broken away for better illustration, of the forward end portion of a tractor, illustrating the present tank type radiator guard and showing its mode of application to a tractor and the association of the pump therewith.

Fig. 2 is a front elevation of the present tank, or tank type radiator guard, for storage and cooling of the fluid pressure medium; a portion of the tank being broken away for better illustration.

Fig. 3 is a horizontal section, taken substantially on the line 3—3 in Fig. 2.

Fig. 4 is an enlarged, sectional detail of one of the tubular end columns, or pipes of the tank, illustrating the character and location of the pressure relief valve.

Fig. 5 diagrammatically illustrates the piping system between the pump, control valve and an operative mechanism.

Referring more in detail to the drawings—1 designates, in general, what may be the forward end portion of a tractor of any one of the ordinary types, or makes, now in general use and 2 designates the forward portion of the tractor engine which is supported within the forward end portion of the tractor main frame structure between the opposite side beams 3—3 thereof.

The tractor engine 2 is here indicated as being equipped with the usual cooling system which includes a water cooling radiator 4 that is located forwardly of the engine, vertically disposed and secured functionally in place transversely of the engine by any suitable means, and usually upon the beams 3—3. The lower header or cross member of the water cooling radiator as here disclosed is located slightly above the level of the engine crank shaft which is designated at 5. This shaft, at its forward end, is equipped with a belt pulley 7, about which a belt 8 operates for driving an air propelling fan 9 in the usual manner; the fan being located between the engine and the water cooling radiator 4, and in its normal and intended mode of operation draws air through the radiator for cooling purposes as is well understood in the art. This direction of flow of cooling air is indicated by the dotted line arrows in Fig. 1.

It is the usual practice in tractor construction, to rigidly mount a metallic guard plate or shield forwardly of the water cooling radiator and to mount this shield upon the frame of the tractor for protection of the radiator and front end portion of the tractor. In the present instance it is intended that this usual radiator shield be removed, and that the present tank type radiator shield be substituted therefor. Thus, it is the intent that the present device shall serve in the dual capacity of a storage tank for the fluid pressure medium employed in the hydraulic system and as a radiator and engine guard. The device, embodying this invention, is designated in its entirety by reference number 10 and in Fig. 1 is shown functionally mounted on the tractor frame.

Referring now more particularly to Figs. 1 and 2, it is to be noted that the present oil storage tank and cooling means 10 comprise two upwardly directed and laterally spaced tubular pipes, or columns 12 and 13 which are mounted rigidly in this upright but slightly rearwardly inclined position, upon a horizontal supporting base plate 14. This base plate, in turn, is bolted, or otherwise rigidly and fixedly secured to the under sides of the end portions of the side beams 3—3 of the tractor main frame. The plate 14 extends below and forwardly of the water cooling radiator 4 to a sufficient extent for the intended mounting of the present tank and radiator guard thereon. Attachment of the vertical columns 12 and 13 to the base plate 14 is effected by means of shoes in the form of flat metal plates 15, which are welded to the lower ends of the columns and are disposed flatly upon the plate 14 and attached thereto by bolts or rivets 16 extended through the plates as shown in Figs. 2 and 3.

The base plate 14, as observed in Figs. 1 and 3, is of substantial size and is shaped to best accommodate its secure attachment to the tractor frame without interfering with other equipment carried by the tractor.

Extending horizontally between the tubular, upright columns 12 and 13 and permanently joined therewith at points near their upper ends by welding, is a tubular header 17. Also, extended horizontally between the columns 12 and 13 substantially midway of their upper and lower ends, and welded thereto is a tubular header 18. The upper header 17 is open at both ends into the vertical columns or pipes 12 and 13, while the lower header 18 is open only into the vertical column 13, being tightly closed at its opposite end by a wall of the column 12 as will be observed by reference to Fig. 4.

Extending vertically between the headers 17 and 18, in close arrangement but leaving air passages 19 between them, are tubes 20. These tubes are of substantial diameter, so that together with the vertical columns 12 and 13, and the cross headers 17 and 18, they will afford adequate storage capacity for the amount of fluid medium, or oil, required in the operation of the hydraulic system.

By reference more particularly to Fig. 4, it will be understood that the vertical column 12 is divided at a point between the levels of the headers 17 and 18 into upper and lower end chambers 22 and 23 by a partition member or disk 25. A preferred form of construction of the column 12 is to form it in two separate tubular members, and to apply them in axial alinement, to opposite faces of the interposed partition disk 25 and to then weld the parts together.

The disk 25 is provided with a central passage 26 into which the lower end of a tubular valve housing 27 is threaded. This housing is equipped with a passage 28 formed with lateral outlets 28' and with a conically tapered seat 29 against which a ball check valve 30 is yieldably held seated to prevent any return flow of oil from the upper chamber 22 after it has been forced past the valve. A coiled spring 31 is contained in the upper end portion of the valve housing and bears against the ball valve 30 to urge it to its closed position. A plug 32 is threaded into the upper end of the valve housing and a bolt 33 is adjustably threaded through this plug and is provided at its lower end with a spring seat 34 against which the coiled spring 31 rests. Thus, by adjustment of the bolt 33, more or less tension may be applied to the ball valve as a means of determining the pressure at which oil will be by-passed from the lower to the upper chamber of the column 12.

The lower ends of the vertical columns 12 and 13 are closed by the base shoes or plates applied thereto. The upper end of the column 12 is closed by a removable cap 38 while the upper end of the column 13 is closed by a plug 39, and removable drainage plugs 37 may be applied in the shoes 15 as noted in Fig. 4.

Located centrally between the lower end portions of the vertical columns or pipes 12 and 13, and below the lower header 18 is the pressure pump 40 which may be of any suitable type of construction, but is herein illustrated as being of the gear type. The pump housing is free of the base plate 14 on which the tank is fixed, and the drive shaft 41 of the pump is extended rearwardly to a supporting bearing, as at 42, in Fig. 1, and is therein flexibly connected with an extension shaft 43, which, in turn, is connected with the engine shaft 5 through the mediacy of a flexible connection with the belt pulley 7, as will be understood by reference to Fig. 1.

The inlet and outlet pipes 45 and 46 communicating with opposite sides of the pump housing have flexible couplings 45' and 46' connecting them with pipe lines 48 and 49 which respectively communicate with the lower end portions of the vertical columns 13 and 12, and the operation of the pump is such that the fluid pressure medium will be drawn from the lower end portion of the column 13 and forcibly delivered into the lower end chamber 23 of the column 12. When a predetermined pressure in the latter has been reached, the ball valve 30 will be unseated, and the medium will be permitted to flow past the valve 30 into the upper end chamber 22 of the column 12, and thence through the horizontal header 17 and downwardly through the vertical cooling pipes 20 to the lower header 18 for return into the column 13, and re-circulation by the pump. For better understanding and identification, the pressure chamber 13 will be designated as the lower chamber, and the cooling chamber, which includes the chamber 22 and the pipes which open directly thereinto, will be designated as the upper chamber.

The hydraulic pressure medium may be delivered to the manual control valve which is diagrammatically shown at 58 in Fig. 5, under the direct pressure of the pump, up to predetermined pressure retained by the relief valve; this delivery being through a pipe connection 60, that leads from the vertical column 12 at a point just below the partition disk 25. Return flow of the pressure medium from the valve 58 is through a pipe 61 which opens into the upper end chamber of the column 12.

The application of this fluid medium under pressure is controlled by the valve 58 which has conduits or pipe connections 65 leading therefrom to the controlled mechanism indicated at 66.

The size of the pipes or tubular members employed in the construction of this particular tank type of radiator guard may be determined to best suit the particular use or type of tractor to which the device is to be applied. Ordinarily, the dimensions over all would be such as to protectively overlie the water cooling radiator across the front of the tractor, but might be extended or reduced to best suit conditions. The spacing of the vertical pipes 20 extended between the headers 17 and 18 would be such as to permit of the necessary or required flow of air between them to the water cooling radiator, and it will be understood that the function of the fan 9 in its intended drawing of air through the water cooling radiator will cause this cooling air to be drawn over the cooling pipes of the present radiator to facilitate the cooling of the fluid medium therein.

To insure the necessary rigidity in the mounting of the present device forwardly of the water cooling radiator, bracing and guard plates or webs, as at 70 in Figs. 1 and 3, are applied to the ends of the tank structure to extend between the vertical columns 12 and 13, and the corresponding upright members of the tractor frame structure which support the water cooling radiator and engine hood. The plates 70 are welded along their forward edges to the columns and are bolted to the radiator frame.

Also, it is desirable that a perforated shield 75 be placed forwardly of the pump as a protection thereto but which is adapted to be removed to give access to the pump when such is desired. Preferably, this shield would extend clear across the front and be forwardly arched and would overlap with the similarly forward arched forward edge portion of the base plate 14 to insure an adequate bracing for the pump guard. A bracket 78 fixed to the guard, along the header 18, supports the top edge of the pump guard plate.

With the present tank type radiator so constructed and applied, it is quite apparent that it will give adequate protection to the water cooling radiator and front end portion of the tractor; that it can be made to provide adequate capacity for a supply of liquid pressure medium; that it will facilitate the cooling of the pressure medium to maintain it at a proper and most satisfactory working temperature, and that a substantial amount of the piping connections usually employed may be eliminated by reason of this disposition of the tank. Furthermore, the relationship of the oil storage tank to the pump, in this arrangement, is such that at no time will there be any occasion for the supply of oil being held back from flow to the pump.

Devices of this character may be varied in size and design as required to adapt them to tractors of various makes, without departing from the spirit of the invention.

Having thus described my invention, what I claim as new therein, and desire to secure by Letters Patent, is—

1. In a tractor, a hydraulic power system comprising a unitary storage tank for a hydraulic pressure medium having a division wall setting off a pressure chamber and a cooling chamber within the tank adapted for connection respectively with opposite sides of a hydraulic power device, a pressure relief valve mechanism providing for by-passing of pressure medium from the pressure chamber into the cooling chamber and a pressure pump having an intake connection for reception of pressure medium from the cooling chamber and having a delivery connection leading into the said pressure chamber.

2. In a tractor, a hydraulic power system comprising a unitary storage tank for a hydraulic pressure medium having a division wall therein setting off a lower pressure chamber and an upper cooling chamber within the tank adapted for connection respectively with pressure and discharge sides of a hydraulic power device, a valve housing providing a direct passage from the pressure chamber into the cooling chamber, a pressure relief valve in the passage and a pressure pump connected to receive hydraulic medium by gravity flow from the said cooling chamber and having a delivery connection leading into the said pressure chamber.

3. In a tractor of the character described, the combination with the tractor engine, a water cooling radiator for the engine and means operable to create a flow of cooling air through said radiator, of a guard for said radiator mounted on the tractor and embodying therein a pressure chamber and a cooling chamber for a hydraulic pressure medium, in the line of flow of the cooling air to be cooled thereby, said chambers being adapted for connection respectively with the pressure and relief sides of a hydraulic power device, and a pressure pump operable by the tractor engine and having its intake side connected to receive pressure medium from the cooling chamber and having connection at its outlet side with the pressure chamber.

4. In a tractor of the character described having a frame structure, an engine, a water cooling radiator forwardly of the engine, and means for creating a flow of cooling air through the radiator, of a radiator guard mounted on the tractor frame forwardly of the water cooling radiator and embodying therein a pressure chamber and a cooling chamber in the path of said cooling air; said chambers being adapted for connection respectively with the pressure and relief sides of a hydraulic power device, a passage directly connecting said chambers, a pressure relief and back check valve in the said passage for relief of pressure in the pressure chamber, and a pressure pump operable by the engine and adapted to receive hydraulic medium from the cooling chamber by gravity flow, and to deliver it under pressure into the pressure chamber.

5. In a hydraulic pressure system of the character described, a storage tank for a hydraulic medium comprising a pair of spaced upright tubular columns closed at their ends; a partition dividing one of the columns between its ends into upper and lower end chambers adapted for connection respectively with the pressure and relief sides of a hydraulic power device, a tubular header opening into and connecting the columns across their upper ends, a tubular header fixed to the columns across their lower portions; said latter header being closed at one end and opening at its other end into the undivided column, a plurality of cooling pipes extending between and opening into the headers and a pressure pump disposed between the columns below the lower header and having its inlet side connected with the lower portion of the undivided column and having its pressure side connected with the lower chamber of the divided column.

6. In a hydraulic pressure system of the character described, a storage tank for a hydraulic medium comprising a pair of spaced upright tubular columns closed at their ends; a partition dividing one of the columns between its ends into upper and lower end chambers adapted for connection respectively with the pressure and relief sides of a hydraulic power device, a tubular header opening into and connecting the said columns across their upper ends, a tubular header fixed to the columns below the upper header; said latter header being closed at one end and open at its other end into the undivided column, a plurality of spaced apart cooling pipes extending vertically between the headers and opening thereinto and a pressure pump disposed between the columns, below the lower header and having its inlet connected with the lower portion of the undivided column and having its pressure side connected with the lower chamber of the divided column; said partition wall having a passage for by-passing of the hydraulic pressure medium from the lower chamber to the upper chamber of the divided column and a pressure relief valve in said passage.

7. In a tractor comprising a main frame, an engine mounted therein, a water cooling radiator supported by the frame forwardly of the engine and means for creating a flow of cooling air through said radiator; a hydraulic power system comprising a storage tank for a hydraulic pressure medium mounted upon the said main frame forwardly of said radiator as a guard therefor and comprising a pair of laterally spaced upright columns closed at their ends, a partition dividing one of the columns between its ends and defining a pressure chamber and a return chamber therein, a horizontal header opening into and joining said tubular columns across their upper ends, another header extending between the columns at a lower level and opening at one end into the undivided column, cooling pipes extended between the headers for the downflow of hydraulic medium therein, and spaced apart for flow between them of the cooling air, a pressure relief valve in the partition, a pressure pump operable by the engine and having discharge and inlet connections with the lower ends of said columns, respectively, a hydraulically operated mechanism, pressure medium connections extended between the opposite sides of the latter and the pressure and relief chambers, and a valve operable to control flow through said connections.

GEORGE S. ALLIN.